Patented Sept. 11, 1951

2,567,848

UNITED STATES PATENT OFFICE 2,567,848

ALKYLATION OF PHENOLIC COMPOUNDS WITH OLEFINS

Eduard C. Kooyman, Amsterdam, Netherlands, assignor to Shell Development Company, San Francisco, Calif., a corporation of Delaware No Drawing. Application July 30, 1948, Serial No. 41,722. In the Netherlands August 1, 1947

2 Claims. (Cl. 260—624)

This invention relates to the production of alkylated phenolic compounds by reacting phenolic compounds with olefins in the presence of a catalyst. It deals particularly with a new catalytic method for carrying out this reaction whereby alkylated phenolic compounds can be produced more economically and in improved yields.

A wide range of catalysts have been used for the alkylation of phenols with olefins. Acids such, for instance, as sulfuric acid and metal halides, particularly the milder Friedel-Crafts type of metal halide catalysts, zinc chloride, and the like, are typical of the catalysts which have been suggested for the reaction. It has been found, however, according to the invention, that the alkylation of phenolic compounds with olefins can be more advantageously carried out by the use of zinc oxide and hydrogen chloride to catalyze the reaction.

One preferred method of carrying out the new process comprises adding zinc oxide to one of the reactants, advantageously the phenolic compound to be alkylated, or to the mixture of the two reactants, and passing hydrogen chloride gas through the mixture while effecting the reaction. The process may be carried out continuously, intermittently or batchwise.

Alkylatable aromatic compounds having a phenolic hydroxy group as a class may be successfully alkylated by the new method. Phenolic compounds having one or a plurality of hydroxy groups and at least one replaceable hydrogen atom are suitable starting compounds for alkylation. Typical examples are, for instance, phenol, the ortho-, meta- and para-cresols, the ethyl phenols, ortho-isopropyl phenols, meta-tertiary butyl phenol, para-isoamyl phenol, the xylenols, 2-methyl-4-ethyl phenol, 3-isopropyl-4-tertiary butyl phenol, thymol, naphthol, o-phenylphenol, p-phenylphenol, resorcinol, guaiacol, pseudocumenol, carvacrol, pyrocatechol, quinol, orcinol, phloroglucinol, pyrogallol, hydroxyquinol, anthranol, phenanthrol, hydroxyquinolin, flavol (2,6-anthracenediol) and the like. Substituted phenolic compounds such as the halophenols, of which 2-chlorophenol, 3,5-dichlorophenol, the monobromophenols and the like are typical, are likewise alkylated successfully by the process of the invention.

As olefinic alkylating agents which may be used in the process there are included those compounds having an unsaturated double bond between two aliphatic carbon atoms of the molecule. Olefins of two to twenty-five carbon atoms per molecule are useful. Primary, secondary or tertiary olefins may be used. Ethylene, propylene, the normal butylenes, isobutylene, the amylenes and the like are useful. The process is especially advantageous with the higher normally liquid olefins. Cyclic olefins such as cyclopentene, cyclohexene, the alkyl cyclopentenes and cyclohexenes, for example the methyl cyclopentenes, etc., octahydronaphthalene, and the like are also suitable alkylating agents according to the invention. The olefins may be used as pure or substantially pure compounds or as mixtures of two or more olefins with or without other compounds which do not interfere with the reaction. Thus, mixtures of olefins obtained by cracking petroleum hydrocarbons or other carbonaceous materials are especially suitable alkylating agents. Such cracking products usually contain nonolefinic hydrocarbons of similar boiling point such as paraffins, naphthenes or aromatic hydrocarbons which need not be removed before using the olefins as alkylating agents. Fractions of cracking products having the same number of carbon atoms per molecule such as the propane-propylene fraction, the butane-butylene fraction or the pentane-amylene or higher fractions may be thus used. Broader fractions such as gasoline or kerosene fractions of cracking products are also suitable. The olefins obtained by cracking paraffin wax or paraffin wax-containing fractions are particularly useful for the preparation of alkyl phenols having eight to twenty carbon atoms in the alkyl group. Where the starting olefinic fraction contains tertiary olefins in admixture with secondary olefins, it may advantageously be used as a source of secondary alkyl phenols by first selectively removing the tertiary olefin content as by selective absorption in sulfuric acid and/or polymerization before alkylating with the remaining less reactive secondary olefins according to the present process. Olefin polymers, particularly dimers, trimers and tetramers of the lower olefins such as propylene, isobutylene and the like or copolymers of different olefins, for example isobutylene and the normal butylenes or propylene, are also useful alkylating agents in the process of the invention, particularly where the production of branched chain alkyl phenolic compounds is desired.

By control of the proportion of olefin to phenolic compound in the reaction mixture, one or more alkyl groups per molecule of phenolic compound may be introduced. For the production of predominantly monoalkylated phenolic compounds, a substantial molecular excess of the phenolic compound to be alkylated to olefin is desirable and, most preferably, a mole ratio of the order of 5:1 to 20:1 or higher is used. In such cases, any polyalkylated products obtained may be recycled to the reaction after separation from the desired monoalkylated product and thus reacted with the phenolic compound being alkylated to increase the yield of monoalkylated phenolic compound. When the production of polyalkylated phenolic compounds is desired, the phenolic compound to be alkylated and olefin may be used in equimolecular proportions or an excess of olefin may be employed. Recycling any monoalkylated product under these circumstances increases the yield of desired polyalkylated phenolic compound.

The alkylation is most preferably carried out with at least one of the reactants in the liquid phase. As a rule, it is advantageous to maintain at least the phenolic compound to be alkylated in the liquid phase. The zinc oxide may then be suspended therein and the olefin and hydrogen chloride added.

Very small amounts of zinc oxide of the order of 0.2% by weight of the reactants involved is effective in the process and preferably about 0.5% to about 2% based on the total weight of the phenolic compound and olefin or olefin mixture used is employed, although larger amounts may be present without interfering with the reaction.

The process may be carried out at temperatures of about 60 to about 180° C. Where the use of superatmospheric pressures is undesirable, the preferred upper limit of reaction temperature will be the boiling temperature of the phenolic compound to be alkylated. In any case, the particular temperature used should be regulated with respect to the activities of the phenolic compound or compounds being alkylated and the olefin or olefins to be reacted therewith. Thus, as a rule, lower reaction temperatures are desirable for alkylations with tertiary olefins than the corresponding normal olefins since they not only alkylate more readily but also are more subject to undesirable polymerization in the process.

A preferred method for carrying out the process batchwise or intermittently comprises gradually adding the olefin or olefin mixture to the phenolic compound to be alkylated, heating to the desired reaction temperature and having the zinc oxide suspended therein. During the reaction hydrochloric acid gas is continually passed through the reaction mixture and should preferably be continued some time after the addition of the last quantity of olefin or olefins. This insures that the quantities of olefin or olefins which have been added last are utilized in the alkylation reaction. By gradually adding the olefins to the reaction mixture, polymerization of the olefins is precluded as much as possible. Upon termination of the alkylation reaction the alkylation product is decanted from the layer of impurities, if such a layer has been formed. The hydrochloric acid gas that is still dissolved in the alkylation product may be removed by passing an inert gas through it, for example nitrogen, while the last traces of hydrochloric acid may be removed by a treatment with, for instance, slaked lime. The alkylation product which has thus been freed from hydrochloric acid gas may be further purified. The unconverted part of the aromatic hydroxy compound or compounds may, for instance, be removed by a vacuum distillation. Unconverted olefins as well as any chlorination products and addition products thereof with hydrochloric acid may be removed by a steam distillation, if desired, at reduced pressure.

For continuous operation the phenolic compound containing the suspended zinc oxide and preferably preheated may be continuously fed to a suitable heated reactor into which the olefin and hydrochloric acid gas are separately fed and the reacted mixture is continuously withdrawn at a rate corresponding to the rate of feed of the reactants. Most advantageously, a reactor of the type disclosed in U. S. Patent 2,332,527 is used; the phenolic compound containing suspended zinc oxide, olefinic alkylating agent and hydrochloric acid being separately fed into a circulating stream of reacted mixture which is withdrawn from the circuit at a point remote from the point of introduction of the feed such that sufficient time is provided for substantial reaction. By this method a large excess of the phenolic compound being alkylated to olefin can be maintained in the mixture by the use of only a relatively small excess in the feed.

The following examples illustrate in more detail suitable methods of carrying out the new process and show some of its advantages.

*Example I*

In a round-bottomed flask with a capacity of 1 liter are introduced 94 g. (1 mol) of phenol and 6 g. (0.075 mol) of zinc oxide. This mixture is stirred and heated to 145° C., upon which 525 g. of $C_{14}$–$C_{18}$ olefins having a bromine number of 64 (2.1 mol) are added in the course of three hours. During this operation a current of dry hydrochloric acid gas is passed through at the rate of approximately 4 liters per hour. After all the olefins have been added drop by drop, stirring is continued for approximately another three hours, dry hydrochloric acid gas being passed through at a rate of 2 litres per hour. From the reaction mixture a viscous, dark-colored mass separates which, after it has been left to stand for 1 hour, has completely settled. The top layer separated therefrom mainly consists of alkylated phenols as well as smaller quantities of unconverted olefins, phenol, alkyl chlorides, alkyl phenyl ethers, polymerized olefins and traces of zinc compounds. Subsequently this layer is stirred with 7 g. of slaked lime at 130° C. for half an hour in order to render the catalyst harmless and remove the free hydrochloric acid present. This turns the color of the mixture from mauve into light brown. The unconverted phenol and the olefins are then removed for the greater part by steam distillation under atmospheric pressure at a temperature of 200° C.–210° C. The resultant condensate has a volume of approximately 2 liters and contains 105 g. of olefins (20% by weight calculated on the initial material) with a bromine number of 18 and a chlorine content of 4%, the quantity of phenol in the aqueous distillate amounting to 6 g. (6.4% by weight calculated on the initial material). The dark-colored residue of the steam distillation is then treated with 14 g. of terrana at 120° C., which renders the color of the product appreciably lighter.

This product—obtained in a quantity of 483 g.—contains 1.73 mol alkyl phenols/kg., i. e. about 84% of the theoretical yield calculated on phenol; based on the phenol used, the yield amounts to approximately 90%. More than 70% by mol of the alkylated phenols consists of dialkyl phenols and more than 25% by mole of monoalkyl phenols, trialkyl phenols being substantially absent. Besides alkylated phenols the product contains approximately 15% by weight of alkyl phenyl ethers, polymerized olefins and halogen-containing compounds.

Similar good results are obtained in the production of decyl cresol by substituting p-cresol and decylene for phenol and the $C_{14}$–$C_{18}$ olefins. In the same way, 2-methyl-4-isobutyl-6-ethyl phenol is produced from 2-methyl-6-ethyl phenol and isobutylene, and 2, 3, 4-trimethyl-6-dodecyl phenol is produced from 2, 3, 4-trimethyl phenol and propylene tetramers.

*Example II*

To show the advantages of the new process, comparative tests were made with zinc oxide in one case and zinc chloride in the other. By alkylating phenol at 140° C. with a mixture of olefins having 14 to 18 carbon atoms per molecule in a quantity of approximately 2.3 grams mol of olefins to 1 gram mol of phenol, while 1.5% by weight of $ZnCl_2$ (calculated on the total quantity of phenol and olefins) was used as catalyst and dry hydrochloric acid gas (totaling 2.5% calculated on the reaction mixture) was passed through, a yield of 75% by weight of alkylated phenols (based on the quantity of phenol applied) was obtained. The olefins were added over a period of 3½ hours. A test carried out under the same conditions, with the exception that in this case an equivalent quantity of zinc oxide (0.9% by weight) instead of zinc chloride was used, gave a yield of 81% by weight of alkylated phenols.

In addition to the fact that with zinc oxide and hydrochloric acid gas better results are obtained than in the case of zinc chloride and hydrochloric acid gas, zinc oxide has the advantage that it is cheaper and easier to handle than zinc chloride. Contrary to zinc chloride, zinc oxide is non-hygroscopic; neither does it blister the skin.

The color of the alkylation products obtained by carrying out the alkylation reaction with a catalyst formed in the reaction mixture or in one of the components thereof from zinc oxide and hydrochloric acid gas is at least as good as the color of the products prepared with zinc chloride and hydrochloric acid gas. This is, for instance, of importance if the resultant alkylation products are converted into the metal salts of alkylated aromatic hydroxy carboxylic acids, which may be used as lubricating oil additives.

It will thus be seen that the process of the invention offers many advantages over prior methods of alkylating phenolic compounds and is capable of wide variation not only with respect to the phenolic compound or mixture thereof which may be alkylated and the olefin or olefins which may be used as alkylating agents, but also in regard to the method of carrying out the reaction. Thus, for example, instead of reacting the entire phenol content of a starting phenolic mixture, a part thereof may be selectively reacted as described in U. S. Patent 2,435,087 and the process thus used to separate phenolic mixtures. Likewise, in alkylating with mixtures of olefins of different reactivities, the conditions may be controlled to selectively react the more reactive of the olefins in preference to other olefins present. Also, while the use of the phenolic compound being alkylated as suspension medium for the zinc oxide has been emphasized because of its advantages, it will be apparent that other suitable inert liquid media may be used as a carrier for the zinc oxide provided its removal from, or presence in, the product is not undesirable. Still other variations may be made in the process while retaining the advantages of the use of zinc oxide and hydrochloric acid as the catalyst. The invention is therefore not to be limited to the details disclosed by way of example nor by any theory proposed in explanation of the improved results which are obtained.

I claim as my invention:

1. A process for the production of dialkyl phenols which comprises suspending zinc oxide in phenol, heating the suspension to a reaction temperature between 60° C. and 180° C., gradually adding to the suspension dry hydrochloric acid gas and cracked wax olefins having from 14 to 18 carbon atoms per molecule, the amount of said zinc oxide being between 0.2% and 2% by weight of said phenol and olefin, and the amount of olefin being in molecular excess with respect to the phenol, whereby dialkyl phenol is produced to the substantial exclusion of trialkyl phenol.

2. A process for the production of a dialkyl phenol which comprises suspending zinc oxide in phenol, heating the suspension to a reaction temperature between 60° C. and 180° C., gradually adding to the suspension dry hydrochloric acid gas and at least one olefin having from 14 to 18 carbon atoms per molecule, the amount of said zinc oxide being between 0.2% and 2% by weight of said phenol and olefin, and the amount of olefin being in molecular excess with respect to the phenol, whereby dialkyl phenol is produced to the substantial exclusion of trialkyl phenol.

EDUARD C. KOOYMAN.

REFERENCES CITED

The following references are of record in the file of this patent:

UNITED STATES PATENTS

| Number | Name | Date |
|---|---|---|
| 2,091,483 | Olin | Aug. 31, 1937 |
| 2,154,192 | Zinke | Apr. 11, 1939 |
| 2,166,136 | Flett | July 18, 1939 |
| 2,205,949 | Schwartz | June 25, 1940 |
| 2,212,805 | Zinke | Aug. 27, 1940 |
| 2,357,978 | Schmerling et al. | Sept. 12, 1944 |
| 2,361,355 | Sachanen et al. | Oct. 24, 1944 |
| 2,448,942 | Winkler et al. | Sept. 7, 1948 |